(12) United States Patent
Euzenat et al.

(10) Patent No.: US 10,316,863 B2
(45) Date of Patent: Jun. 11, 2019

(54) JET PUMP FOR TURBOMACHINE LUBRICATION CHAMBER DEPRESSURIZATION CIRCUIT

(71) Applicant: Snecma, Paris (FR)

(72) Inventors: Melaine Tanguy Euzenat, Paris (FR); Gilles Yves Aouizerate, Chennevieres-sur-Marne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 412 days.

(21) Appl. No.: 15/025,447

(22) PCT Filed: Sep. 30, 2014

(86) PCT No.: PCT/FR2014/052460
§ 371 (c)(1),
(2) Date: Mar. 28, 2016

(87) PCT Pub. No.: WO2015/049453
PCT Pub. Date: Apr. 9, 2015

(65) Prior Publication Data
US 2016/0215795 A1 Jul. 28, 2016

(30) Foreign Application Priority Data
Oct. 3, 2013 (FR) ..................................... 13 59583

(51) Int. Cl.
*F04F 5/46* (2006.01)
*F01D 25/20* (2006.01)
(Continued)

(52) U.S. Cl.
CPC ................ *F04F 5/46* (2013.01); *F01D 25/20* (2013.01); *F02C 3/32* (2013.01); *F02C 7/06* (2013.01);
(Continued)

(58) Field of Classification Search
CPC ...... F04F 5/46; F04F 5/24; F04F 5/461; F04F 5/467; F04F 5/54; F04D 29/063;
(Continued)

(56) References Cited

U.S. PATENT DOCUMENTS 1,541,321 A * 6/1925 Broido .................... F04F 5/469
417/167
2,106,804 A 2/1938 Kirgan
(Continued)

FOREIGN PATENT DOCUMENTS

FR 1 451 539 A 1/1966
FR 2 705 733 A1 12/1994

OTHER PUBLICATIONS

Search Report issued in French Patent Application No. FR 13 59583 dated Jun. 30, 2014.
(Continued)

*Primary Examiner* — Peter J Bertheaud
*Assistant Examiner* — Dnyanesh G Kasture
(74) *Attorney, Agent, or Firm* — Pearne & Gordon LLP

(57) ABSTRACT

A jet pump (10) comprising a tubular body (12), a first injection duct (14) which opens into the body (12) via a first outlet nozzle (18), a second injection duct (16) which opens into the body (12) via a second outlet nozzle (20) which surrounds the first outlet nozzle (18), the downstream end (20*a*) of the second outlet nozzle (20) being situated axially level with the downstream end (18*a*) of the first outlet nozzle (18), wherein the upstream end (18*b*) of the first nozzle (18) comprises an axial orifice (30) centered on the main axis of the body (12), and in that the jet pump (10) is configured for either plugging or not plugging the axial orifice (30) of the first outlet nozzle (18).

16 Claims, 2 Drawing Sheets

(51) Int. Cl.
*F02C 3/32* (2006.01)
*F02C 7/06* (2006.01)
*F04F 5/54* (2006.01)
*F04D 29/063* (2006.01)
*F04F 5/24* (2006.01)
*F16N 13/00* (2006.01)

(52) U.S. Cl.
CPC .............. *F04D 29/063* (2013.01); *F04F 5/24* (2013.01); *F04F 5/461* (2013.01); *F04F 5/467* (2013.01); *F04F 5/54* (2013.01); *F16N 13/00* (2013.01); *F05D 2260/601* (2013.01); *F16N 2013/006* (2013.01)

(58) Field of Classification Search
CPC .... F16N 13/00; F16N 2013/006; F01D 25/20; F02C 7/06; F02C 3/32; F05D 2260/601; F16K 15/02; F16K 15/025; F16K 15/04; F16K 15/044
See application file for complete search history.

(56) References Cited

U.S. PATENT DOCUMENTS

| | | | |
|---|---|---|---|
| 2,340,671 A * | 2/1944 | Lingenbrink | F04F 5/30 417/165 |
| 5,429,208 A | 7/1995 | Largillier | |
| 2007/0200011 A1 * | 8/2007 | Ibrahim | F02M 47/027 239/533.2 |

OTHER PUBLICATIONS

International Search Report issued in Application No. PCT/FR2014/052460 dated Jan. 20, 2015.

Written Opinion issued in Application No. PCT/FR2014/052460 dated Jan. 20, 2015.

* cited by examiner

JET PUMP FOR TURBOMACHINE LUBRICATION CHAMBER DEPRESSURIZATION CIRCUIT

TECHNICAL FIELD

The invention relates to a jet pump for a turbomachine lubrication chamber depressurisation circuit designed to optimise the gas flows passing through said jet pump.

The invention more particularly relates to a jet pump comprising two concentric injection nozzles used to limit the disruptions occurring when the central nozzle is not supplied with air.

PRIOR ART

In a turbomachine such as a jet engine equipping an aircraft, the bearings are continuously lubricated via lubricant supply circuits. Such a circuit normally comprises a lubricant reservoir and a pump used to transport the fluid to a spray nozzle located in the immediate vicinity of each of the bearings. The bearings are themselves positioned in closed lubrication chambers by dynamic seals.

In order to prevent the oiled air contained in a lubrication chamber from escaping outside of said chamber through the dynamic seals, the pressure inside the lubrication chamber is maintained at a specific value that is less than the outside pressure.

For this purpose, the turbomachine comprises a lubrication chamber depressurisation circuit that connects the inner volume of the lubrication chamber to the secondary flow path of the turbomachine. The air pressure in the secondary flow path of the turbomachine is less than the pressure in the lubrication chamber, which creates a suction phenomenon aspirating the oiled air contained in the lubrication chamber.

The depressurisation circuit comprises an air deoiling device that creates load losses reducing the suction phenomenon. In order to compensate for these load losses and to improve the suction phenomenon, one proposal involves mounting a jet pump in the depressurisation circuit, which locally injects pressurised air into the depressurisation circuit in order to create an additional suction phenomenon.

As shown in FIG. 1, a standard jet pump 10 comprises a tubular body 12 through which flows the gas flow originating from the lubrication chamber and comprises two compressed air supply ducts 14, 16 that open out via two concentric nozzles 18, 20 arranged inside the body 12, coaxially to the body 12. The compressed air intended to feed each of the ducts 14, 16 is taken from the turbomachine compressor.

A first radially central nozzle 18 is associated with a first duct 14, which is supplied with air in a selective manner to increase the suction phenomenon when the air flow in the secondary flow path is relatively low. This is in particular the case when the turbomachine is idling.

The second nozzle 20 is associated with the second duct 16, which is continuously supplied with compressed air.

The two nozzles 18, 20 open into the body 12 at their downstream axial ends 18a, 20a, according to the direction of gas flow in the body 12, and these downstream axial ends 18a, 20a are located substantially in the same axial position in relation to each other.

When only the second duct 16 is supplied with air, the air flow exiting the second nozzle 20 flows in the shape of a ring around the downstream end 18a of the first nozzle 18.

Given that the downstream end 18a of the first nozzle 18 is open, a parasitic phenomenon occurs, sucking the air contained in the first nozzle 18, which disrupts the air flow exiting the second nozzle 20.

Moreover, the nozzles 18, 20 are located in the path of the main gas flow, disrupting the latter.

The purpose of the invention is therefore to propose a jet pump designed to reduce the disruptions to the main gas and air flows described hereinabove.

DESCRIPTION OF THE INVENTION

The invention relates to a jet pump for a lubrication chamber depressurisation device comprising a tubular body, in which flows a main gas flow, a first injection duct for injection of a first air flow in the main gas flow, which opens into the body via a first tubular outlet nozzle located inside the body and that is coaxial to the main axis of the body and open at its downstream end, a second injection duct for injection of a second air flow in the main gas flow, which opens into the body via a second outlet nozzle located inside the body, that is coaxial to the main axis of the body and that surrounds the first outlet nozzle, the downstream end of the second outlet nozzle being situated axially at the downstream end of the first outlet nozzle, characterised in that the upstream end of the first nozzle comprises an axial orifice centred on the main axis of the body, and in that the jet pump comprises means for either plugging or not plugging said axial orifice of the first outlet nozzle.

The axial orifice of the first nozzle is designed to circulate a portion of the gas flow through the first nozzle when this axial orifice is not plugged, which eases the circulation of the gas flow through the jet pump while not disrupting the air flow originating from the second outlet nozzle.

Preferably, said plugging means are capable of plugging said axial orifice of the first nozzle when the first air flow is circulating in the first injection duct and of not plugging said axial orifice of the first nozzle when no air flow is circulating in the first injection duct.

Preferably, the first injection duct comprises a radial channel that opens into an orifice of the cylindrical wall of the first nozzle, and said plugging means are capable of plugging said orifice associated with the radial channel of the first injection duct when no air flow is circulating in the first injection duct and of not plugging said orifice associated with the radial channel of the first injection duct when the first air flow is circulating in the first injection duct.

Preferably, the plugging means include a plugging element that is mounted such that it can move between a position plugging the axial orifice of the first nozzle and a position plugging said orifice associated with the radial channel of the first injection duct.

Preferably, the plugging means include means for bringing the plugging element back to the position plugging the upstream section of the first injection duct.

Preferably, the plugging element consists of a check valve rotatably mounted in the jet pump.

Preferably, the plugging element consists of a ball of a shuttle valve.

The invention also relates to a turbomachine lubrication chamber depressurisation device, comprising a depressurisation duct connecting the inner volume of the lubrication chamber to a secondary flow path of the turbomachine, in which flows a gas flow from the lubrication chamber to the secondary flow path of the turbomachine, the depressurisation duct comprising a jet pump according to the invention, for injecting an air flow into the gas flow, said air flow originating from a turbomachine compressor.

Preferably, the first injection duct of the jet pump is supplied with pressurised air in a selective manner, said air originating from a turbomachine compressor and the second injection duct of the jet pump is continuously supplied with pressurised air originating from the compressor.

The invention further proposes an aircraft turbomachine comprising at least one bearing lubrication chamber and one lubrication chamber depressurisation device according to the invention and that is equipped with a jet pump according to the invention.

BRIEF DESCRIPTION OF THE FIGURES

Other characteristics and advantages of the invention shall be better understood upon reading the following detailed description given with reference to the appended figures, in which.

DETAILED DESCRIPTION OF THE SPECIFIC EMBODIMENTS

Figure 1:
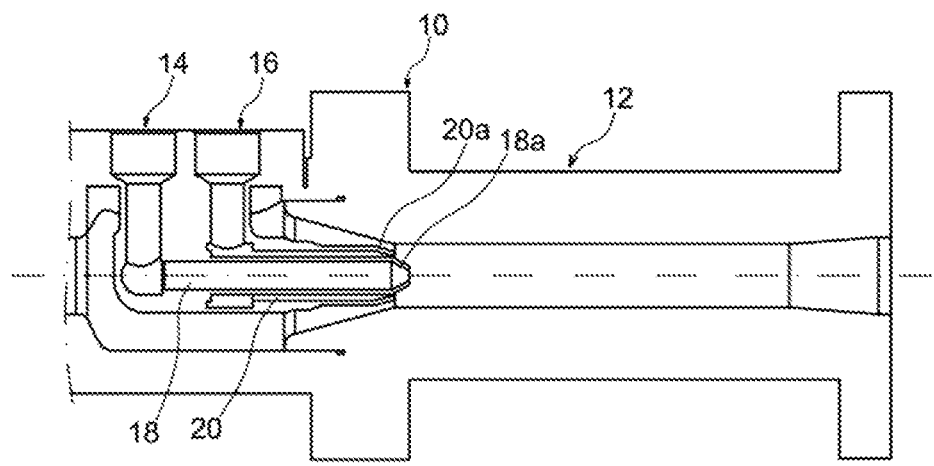
FIG. 1 is an axial cross-section of a depressurisation device comprising a jet pump from the prior art.
Figure 2:
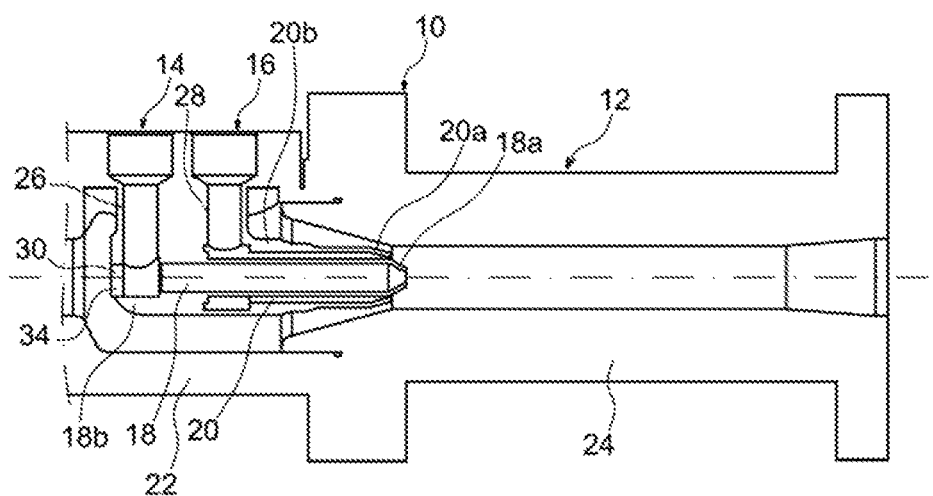
FIG. 2 is an axial cross-section of a depressurisation device comprising a jet pump according to the invention.

FIG. 2 shows a jet pump 10 intended to be installed in a depressurisation circuit of a lubrication chamber of a turbomachine bearing (not shown). The depressurisation circuit receiving the jet pump 10 connects the lubrication chamber to a secondary flow path of the turbomachine and further comprises a deoiling device for deoiling the gas flow originating from the lubrication chamber, located upstream of the jet pump 10, according to the direction of gas flow.

The air pressure in the secondary flow path is lower than the pressure in the lubrication chamber, naturally creating a suction phenomenon aspirating the gas present in the lubrication chamber, which flows towards the secondary flow path, passing through the deoiling device then through the jet pump 10.

The jet pump 10 consists in injecting a compressed air flow into the gas flow, said air flow originating from the turbomachine compressor, to increase the aforementioned suction phenomenon.

The jet pump 10 comprises a body 12 that has an overall tubular shape, through which a gas flow is intended to pass, said gas flow originating from the lubrication chamber and intended to be released into a secondary flow path (not shown) of the turbomachine.

In the following description, the upstream and downstream orientations shall be referred to as being the axial direction of the body 12 from left to right with reference to the figures.

The jet pump 10 comprises a device for injecting pressurised air into the gas flow that opens into an upstream section 22 of the body 12, and which injects the pressurised air in a coaxial manner and in the same direction as the gas flow originating from the lubrication chamber.

The body 12 comprises a downstream section 24 with a reduced inner cross-section located at the immediate outlet of the injection device and through which the gas mixed with the injected air passes.

Thanks to the injected air flow and the shape of the downstream section 24, a suction phenomenon occurs, consequently aspirating the gas from the lubrication chamber.

The pressurised air injection device comprises two injection ducts 14, 16 which open into the upstream section 22 of the body 12 via two coaxial nozzles 18, 20. The use of two injection ducts 14, 16 allows two different air flows to be injected according to the operating conditions of the turbomachine.

Therefore, for example, when the turbomachine is operating at reduced speed, for which the pressure difference between the lubrication chamber and the secondary flow path is limited, the two injection ducts are supplied with air, which increases the suction phenomenon.

However, when the turbomachine is operating at a higher speed, a single injection duct 16 is supplied with air. The air flow rate used for the jet pump 10 is therefore limited, which enables a larger portion of the air compressed by the turbomachine compressor to be dedicated to turbomachine operation, thus limiting the loss of efficiency caused by the jet pump 10.

The two nozzles 18, 20 are coaxial to each other and are also coaxial to the body 12 of the jet pump 10. The gas flow originating from the lubrication chamber flows around the nozzles 18.

A first nozzle 18 is arranged centrally and generally consists in a tubular element coaxial to the main axis of the body 12, and comprises a downstream end 18a at which the first nozzle 18 opens out near to the second section 24 of the body 12.

The second nozzle 20 is arranged around the first nozzle 18, has a mainly ringed shape and comprises a ring-shaped downstream end 20a at which the second nozzle 20 opens out, located axially level with the downstream end 18a of the first nozzle 18.

Each duct 14, 16 further comprises a radial channel 26, 28 for supplying the associated nozzle 18, 20, which opens into the upstream axial end 18b, 20b of the associated nozzle 18, 20. The radial channel 26 associated with the first nozzle 18 is located upstream of the radial channel 28 associated with the second nozzle 20. Therefore, the upstream end 18b of the first nozzle 18 is located upstream of the upstream end 20b of the second nozzle 20.

The upstream radial channel 26 opens into the upstream end 18b of the first nozzle 18 in an orifice 32 located on the cylindrical wall of the upstream end 18b of the first nozzle 18.

When operating the turbomachine at high speed, only the second duct 16 is supplied with pressurised air and the first duct 14 is not used.

In order to limit the effect of the first nozzle of the flow of gas in the jet pump 10, the upstream end 18b of the first nozzle 18 comprises an orifice 30 centred on the main axis of the body 12, which is axially aligned with the opening of the downstream end 18a of the first nozzle 18.

Figure 4:
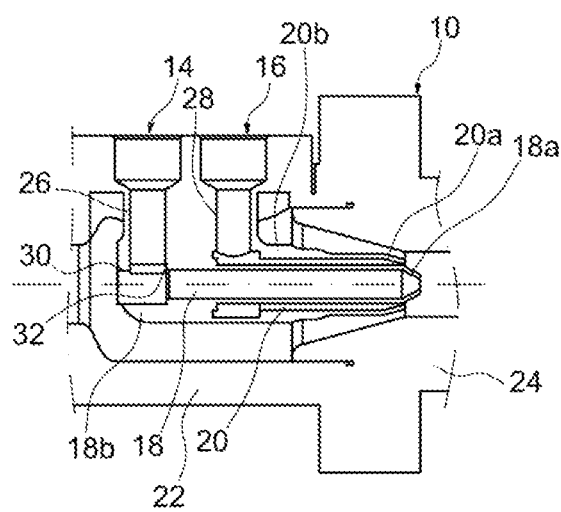
FIG. 4 is a similar view to that in FIG. 3, wherein the plugging means are not plugging the upstream end of the first nozzle.

Therefore, as shown in FIG. 4, the flow of gas flowing through the jet pump 10 can flow through the first nozzle 18, thus limiting the load losses produced by the latter's presence.

The first nozzle 18 therefore comprises two orifices 30, 32 arranged level with its upstream end 18b, the first orifice 30 allowing for the circulation of a portion of the gas flow originating from the lubrication chamber, the other orifice 32 corresponding to the radial channel 26 that opens into the first nozzle 18.

To prevent the axial orifice 30 of the upstream end 18b of the first nozzle 18 from disrupting the pressurised air flow circulating in the first nozzle 18 when the first duct 14 supplies the jet pump 10 with pressurised air, the jet pump 10 further comprises means for plugging or not plugging the axial orifice 30 of the upstream end 18b of the first nozzle 18.

Figure 3:
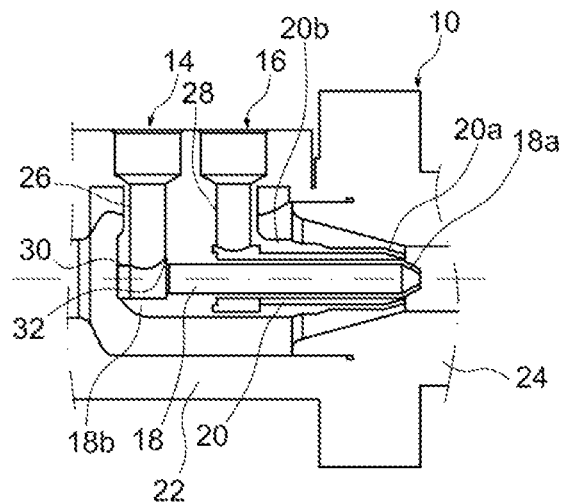
FIG. 3 is a larger scale detailed view of the jet pump shown in FIG. 2, wherein the plugging means are plugging the upstream end of the first nozzle.

As shown in FIGS. 3 and 4, the plugging means 34 are produced so as to plug the axial orifice 30 when a pressurised air flow is passing through the first duct 14, and so as to not plug the axial orifice 30 when a pressurised air flow is not passing through the first duct 14.

Additionally, the plugging means are produced so as to plug the orifice 32 associated with the radial channel 26 when a pressurised air flow is not passing through the first duct, and so as to not plug the orifice 32 associated with the radial channel 26 when a pressurised air flow is passing through the first duct.

Consequently, the plugging means are produced such that they plug either one of the two orifices 30, 32 of the upstream end 18b of the first nozzle 18.

The plugging means include a plugging element 34 that is mounted such that it can move in relation to the upstream end 18b of the first nozzle 18 between a position plugging the axial orifice 30 shown in FIG. 3 and a position plugging the orifice 32 associated with the radial channel 26 shown in FIG. 4.

When in a position plugging an orifice 30, 32, the plugging element does not plug the other orifice 32, 30 respectively.

Preferably, the plugging element 34 is driven from the position plugging the axial orifice 30 to the position plugging the orifice 32 associated with the radial channel 26 using elastic means (not shown). Therefore, the plugging element 34 is automatically brought back to the position plugging the orifice 32 associated with the radial channel 26 when the first duct 14 is no longer supplied with pressurised air.

The plugging element 34 is driven from the position plugging the orifice 32 associated with the radial channel 26 to the position plugging the axial orifice 30 by the pressure exerted by the pressurised air flow circulating in the first duct 14, which exerts a force on the plugging element opposite to the force bringing the plugging element 34 back to the position plugging the orifice 32 associated with the radial channel 26, applied by the aforementioned elastic means.

According to the embodiment shown in FIGS. 2 to 4, the plugging element 34 consists of a check valve, known as a "wafer", rotatably mounted in the upstream end of the first nozzle.

According to one alternative embodiment not shown in the figures, the plugging element consists of a ball of a system known as a "shuttle valve", further comprising an elastic spring for bringing the ball back to the position plugging the orifice 32 associated with the radial channel 26.

What is claimed is:

1. A jet pump for a lubrication chamber depressurization device comprising a tubular body in which flows a main gas flow,
    a first injection duct for injection of a first air flow in the main gas flow, which opens into the tubular body via a first tubular outlet nozzle located inside the tubular body and that is coaxial with a main axis of the tubular body and open at its downstream end,
    a second injection duct for injection of a second air flow in the main gas flow, which opens into the tubular body via a second outlet nozzle located inside the tubular body that is coaxial with the main axis of the tubular body and that surrounds the first tubular outlet nozzle, the downstream end of the second outlet nozzle axially aligning with the downstream end of the first tubular outlet nozzle,
    wherein an upstream end of the first tubular outlet nozzle comprises an axial orifice centered on the main axis of the tubular body,
    and in that the jet pump comprises a plugging means for either plugging or not plugging said axial orifice of the first tubular outlet nozzle, wherein said plugging means physically contacts the axial orifice during a plugging operation.

2. The jet pump according to claim 1, wherein said plugging means are capable of plugging said axial orifice of the first tubular outlet nozzle when the first air flow is circulating in the first injection duct and of not plugging said axial orifice of the first tubular outlet nozzle when no air flow is circulating in the first injection duct.

3. The jet pump according to claim 2, wherein the first injection duct comprises a radial channel that opens into an orifice associated with the radial channel, the orifice associated with the radial channel being disposed in a cylindrical wall of the first tubular outlet nozzle, wherein said plugging means are capable of plugging said orifice associated with the radial channel of the first injection duct when no air flow is circulating in the first injection duct and of not plugging said orifice associated with the radial channel of the first injection duct when the first air flow is circulating in the first injection duct.

4. The jet pump according to claim 3, wherein the plugging means include a plugging element that is mounted such that it can move between a position plugging the axial orifice of the first tubular outlet nozzle and a position plugging said orifice associated with the radial channel of the first injection duct.

5. The jet pump according to claim 4, wherein the plugging means include means for bringing the plugging element back to a position plugging an upstream section of the first injection duct.

6. The jet pump according to claim 5, wherein the plugging element consists of a check valve rotatably mounted in the jet pump.

7. The jet pump according to claim 5, wherein the plugging element consists of a ball of a shuttle valve.

8. The jet pump according to claim 1, wherein the upstream end of the first tubular outlet nozzle comprises a radial wall separating an inner volume of the first tubular nozzle from an inner volume of the tubular body and the axial orifice extends through the radial wall.

9. The jet pump according to claim 1, wherein the first injection duct connects to the first tubular outlet nozzle between the axial orifice and the downstream end of the first tubular outlet nozzle.

10. A turbomachine lubrication chamber depressurization device comprising a depressurization duct connecting an inner volume of a lubrication chamber to a secondary flow path of a turbomachine, in which flows a gas flow from the lubrication chamber to the secondary flow path of the turbomachine, the depressurization duct comprising a jet pump, for injecting an air flow into the gas flow, said air flow originating from a turbomachine compressor, the jet pump comprising:
- a tubular body in which flows the gas flow,
- a first injection duct for injection of a first air flow in the gas flow, which opens into the tubular body via a first tubular outlet nozzle located inside the tubular body and that is coaxial with a main axis of the tubular body and open at its downstream end,
- a second injection duct for injection of a second air flow in the gas flow, which opens into the tubular body via a second outlet nozzle located inside the tubular body that is coaxial with the main axis of the tubular body and that surrounds the first tubular outlet nozzle, the downstream end of the second outlet nozzle axially aligning with the downstream end of the first tubular outlet nozzle,
- wherein an upstream end of the first tubular outlet nozzle comprises an axial orifice centered on the main axis of the tubular body,
- and in that the jet pump comprises a plugging means for either plugging or not plugging said axial orifice of the first tubular outlet nozzle, wherein said plugging means physically contacts the axial orifice during a plugging operation.

11. The depressurization device according to claim 10, wherein the first injection duct of the jet pump is supplied with pressurized air in a selective manner, said air originating from the turbomachine compressor and the second injection duct of the jet pump is continuously supplied with pressurized air originating from the turbomachine compressor.

12. The depressurization device according to claim 10, wherein the upstream end of the first tubular outlet nozzle comprises a radial wall separating an inner volume of the first tubular nozzle from an inner volume of the tubular body and the axial orifice extends through the radial wall.

13. The depressurization device according to claim 10, wherein the first injection duct connects to the first tubular outlet nozzle between the axial orifice and the downstream end of the first tubular outlet nozzle.

14. An aircraft turbomachine comprising at least one bearing lubrication chamber and one lubrication chamber depressurization device, the one lubrication chamber depressurization device comprising a depressurization duct connecting an inner volume of the at least one bearing lubrication chamber to a secondary flow path of the aircraft turbomachine, in which flows a gas flow from the at least one bearing lubrication chamber to the secondary flow path of the aircraft turbomachine and a jet pump for the one lubrication chamber depressurization device, the jet pump comprising:
- a tubular body in which flows the gas flow,
- a first injection duct for injection of a first air flow in the gas flow, which opens into the tubular body via a first tubular outlet nozzle located inside the tubular body and that is coaxial with a main axis of the tubular body and open at its downstream end,
- a second injection duct for injection of a second air flow in the gas flow, which opens into the tubular body via a second outlet nozzle located inside the tubular body that is coaxial with the main axis of the tubular body and that surrounds the first tubular outlet nozzle, the downstream end of the second outlet nozzle being axially aligned with the downstream end of the first tubular outlet nozzle,
- wherein an upstream end of the first tubular outlet nozzle comprises an axial orifice centered on the main axis of the tubular body,
- and in that the jet pump comprises a plugging means for either plugging or not plugging said axial orifice of the first tubular outlet nozzle, wherein said plugging means physically contacts the axial orifice during a plugging operation.

15. The aircraft turbomachine according to claim 14, wherein the upstream end of the first tubular outlet nozzle comprises a radial wall separating an inner volume of the first tubular nozzle from an inner volume of the tubular body and the axial orifice extends through the radial wall.

16. The aircraft turbomachine according to claim 14, wherein the first injection duct connects to the first tubular outlet nozzle between the axial orifice and the downstream end of the first tubular outlet nozzle.

\* \* \* \* \*